US012452591B2

(12) United States Patent
Fu et al.

(10) Patent No.: US 12,452,591 B2
(45) Date of Patent: Oct. 21, 2025

(54) SPEAKER TEMPERATURE PROTECTION METHOD AND DEVICE, ELECTRONIC DEVICE, AND COMPUTER-READABLE STORAGE MEDIUM

(71) Applicant: AAC Technologies (Nanjing) Co., Ltd., Jiangsu (CN)

(72) Inventors: Hongling Fu, Nanjing (CN); Ruizhi Lan, Nanjing (CN); Lijian Ye, Nanjing (CN)

(73) Assignee: AAC Technologies (Nanjing) Co., Ltd., Nanjing (CN)

( * ) Notice: Subject to any disclaimer, the term of this patent is extended or adjusted under 35 U.S.C. 154(b) by 176 days.

(21) Appl. No.: 18/401,721

(22) Filed: Jan. 2, 2024

(65) Prior Publication Data

US 2024/0340580 A1 Oct. 10, 2024

Related U.S. Application Data

(63) Continuation of application No. PCT/CN2023/087027, filed on Apr. 7, 2023.

(51) Int. Cl.
*H04R 3/00* (2006.01)

(52) U.S. Cl.
CPC .................................... *H04R 3/007* (2013.01)

(58) Field of Classification Search
None
See application file for complete search history.

(56) References Cited

FOREIGN PATENT DOCUMENTS

| | | | | | |
|---|---|---|---|---|---|
| CN | 110868672 | A | * | 3/2020 | H04R 3/00 |
| CN | 113810833 | A | * | 12/2021 | H04R 9/06 |
| CN | 116233695 | A | * | 6/2023 | H04R 3/00 |
| CN | 116389978 | A | * | 7/2023 | H04R 3/00 |

* cited by examiner

*Primary Examiner* — Qin Zhu
(74) *Attorney, Agent, or Firm* — Wiersch Law Group

(57) ABSTRACT

A speaker temperature protection method, a speaker temperature protection device, an electronic device, and a computer-readable storage medium are provided. The speaker temperature protection method includes creating a target transfer function based on a first measured temperature of the speaker and a first measured fusion voltage relative to the combination device, obtaining a first predicted temperature of the speaker based on the target transfer function, and determining a target gain according to the first predicted temperature of the speaker and a first fusion power relative to the combination device, and performing gain processing on an original audio signal input to the combination device based on the target gain, so as to provide temperature protection for the speaker. In this way, a temperature of the speaker is kept below a maximum allowable temperature and audio distortion is reduced.

10 Claims, 9 Drawing Sheets

SPEAKER TEMPERATURE PROTECTION METHOD AND DEVICE, ELECTRONIC DEVICE, AND COMPUTER-READABLE STORAGE MEDIUM

TECHNICAL FIELD

The present disclosure relates to coaxial speakers, and in particular to a speaker temperature protection method, a speaker temperature protection device, an electronic device, and a computer-readable storage medium.

BACKGROUND

In order to save costs and space, a speaker and a motor are generally driven by one power amplifier after being connected in series in the mobile phone market. However, such a design brings a series of problems, for example, a single power amplifier only has one total voltage, a temperature of the speaker may gradually rise to exceed a bearing range of the speaker when the speaker sends out a large signal without protection, thereby generating noise or causing other abnormal situations. Moreover, modeling by using a conventional single speaker thermal model may cause over-compression, resulting in a relatively large loss on speaker sound loudness.

SUMMARY

The present disclosure aims to provide a speaker temperature protection method, a speaker temperature protection device, an electronic device, and a computer-readable storage medium to at least solve a problem in the related art that temperature over-compression of the speaker and relatively large loss on speaker sound loudness are caused due to modeling by a single speaker.

In order to achieve above aims, in a first aspect, the present disclosure provides a speaker temperature protection method, applied to a device including a power amplifier and a combination device including a speaker and a motor, including:

- creating a target transfer function based on a first real-time temperature of the speaker and a first real-time fusion voltage relative to the combination device;
- obtaining a first predicted temperature of the speaker based on the target transfer function, and determining a target gain according to the first predicted temperature of the speaker and a first fusion power relative to the combination device; and
- performing gain processing on an original audio signal input to the combination device based on the target gain, so as to provide temperature protection for the speaker.

In a second aspect, the present disclosure provides a speaker temperature protection device applied to a device, the device includes a power amplifier and a combination device, and the combination device includes a speaker and a motor. The speaker temperature protection device includes a creating module, a determining module, and a gain processing module. The creating module is configured to create a target transfer function based on a first real-time temperature of the speaker and a first real-time fusion voltage relative to the combination device, the determining module is configured to determine a target gain according to a first predicted temperature of the speaker obtained based on the target transfer function and a first fusion power relative to the combination device, and the gain processing module is configured to perform gain processing on an original audio signal input to the combination device based on the target gain, so as to provide temperature protection for the speaker.

In a third aspect, the present disclosure provides an electronic device, including a memory and a processor. The processor is configured to execute a computer program stored in the memory. The processor executes the computer program to execute the speaker temperature protection method as foregoing.

In a fourth aspect, the present disclosure provides a computer-readable storage medium, the computer-readable storage medium includes a computer program, and the computer program is executed by a processor to execute the speaker temperature protection method as foregoing.

Based on above, the present disclosure provides the speaker temperature protection method, the speaker temperature protection device, the electronic device, and the computer-readable storage medium, the speaker temperature protection method includes creating the target transfer function based on the first real-time temperature of the speaker and the first real-time fusion voltage relative to the combination device, obtaining the first predicted temperature of the speaker based on the target transfer function, and determining the target gain according to the first predicted temperature of the speaker and the first fusion power relative to the combination device, and performing the gain processing on the original audio signal input to the combination device based on the target gain, so as to provide the temperature protection for the speaker. According to the present disclosure, the target transfer function is created according to a heat transfer model of the motor and the speaker, and the target gain is obtained through combining a predicted temperature of the speaker obtained based on the target transfer function and a fusion power relative to the combination device, the gain processing is performed on the original audio signal input to the combination device based on the target gain, so that a temperature of the speaker is kept below a maximum allowable temperature and audio distortion is reduced.

BRIEF DESCRIPTION OF DRAWINGS

In order to more clearly illustrate embodiments of the present disclosure or technical solutions in the related art, drawings that need to be used in the embodiments or the related art are briefly described below, and it is obvious that the accompanying drawings in following description are merely some embodiments of the present disclosure, and those who skilled in the art may obtain other drawings according to these drawings without involving any inventive effort.

DETAILED DESCRIPTION

In order to make objectives, features, and advantages of the present disclosure more obvious and understandable, technical solutions in the embodiments of the present disclosure are clearly and completely described below with reference to accompanying drawings in the embodiments of the present disclosure. Obviously, the described embodiments are merely some embodiments of the present disclosure, rather than all embodiments. All other embodiments obtained by those who skilled in the art based on the embodiments of the present disclosure without creative efforts shall fall within a protection scope of the present disclosure.

In addition, terms "first" and "second" are used for descriptive purposes only and cannot be understood as indicating or implying relative importance or implicitly indicating the number of indicated technical features. Thus, features defined with "first" and "second" may explicitly or implicitly include one or more of the features. In the description of the embodiments of the present disclosure, a meaning of "a plurality of" is two or more, unless specifically defined otherwise.

Figure 1:
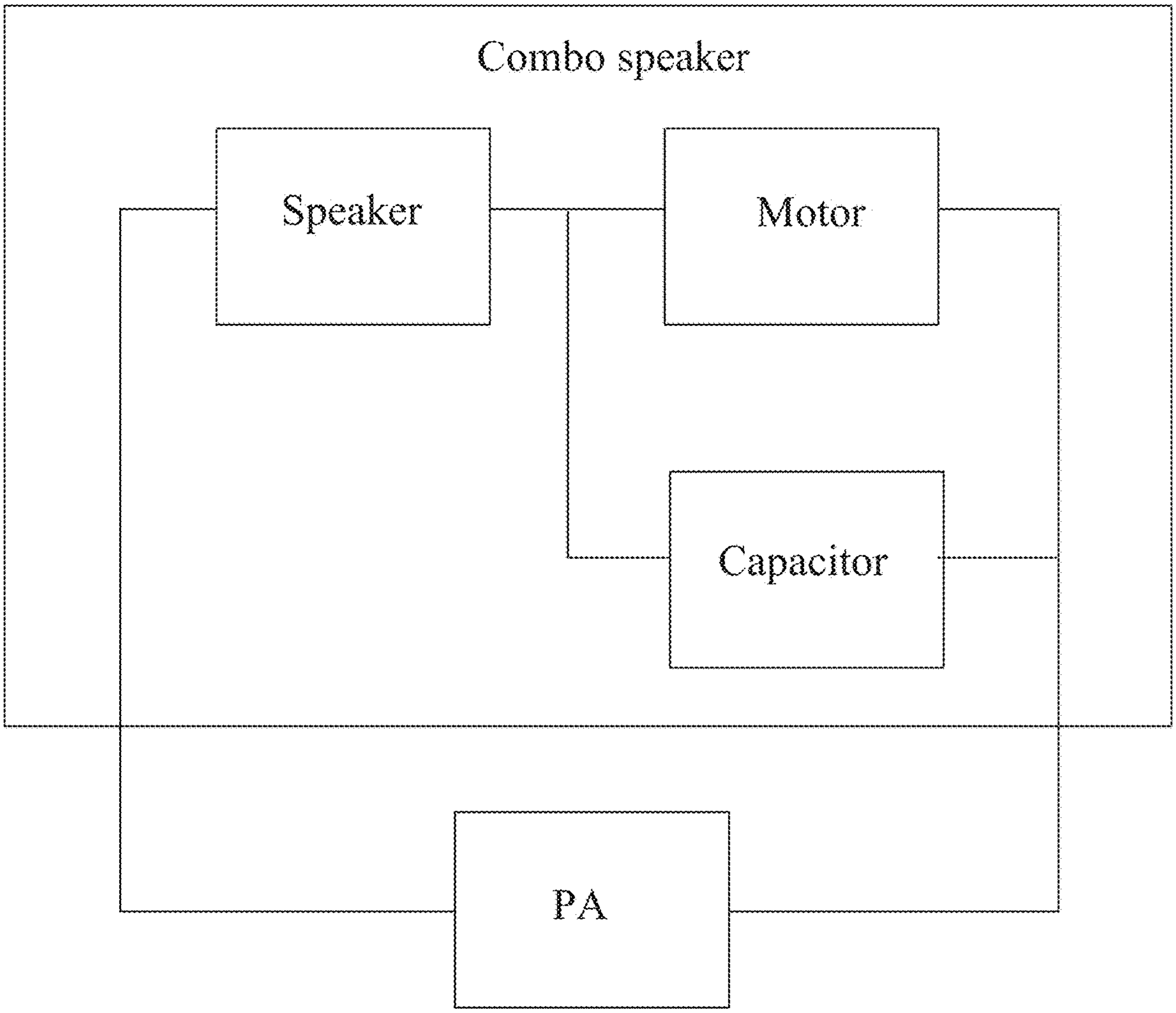
FIG. 1 is a structural schematic diagram of a device according to a first embodiment of the present disclosure.
Figure 2:
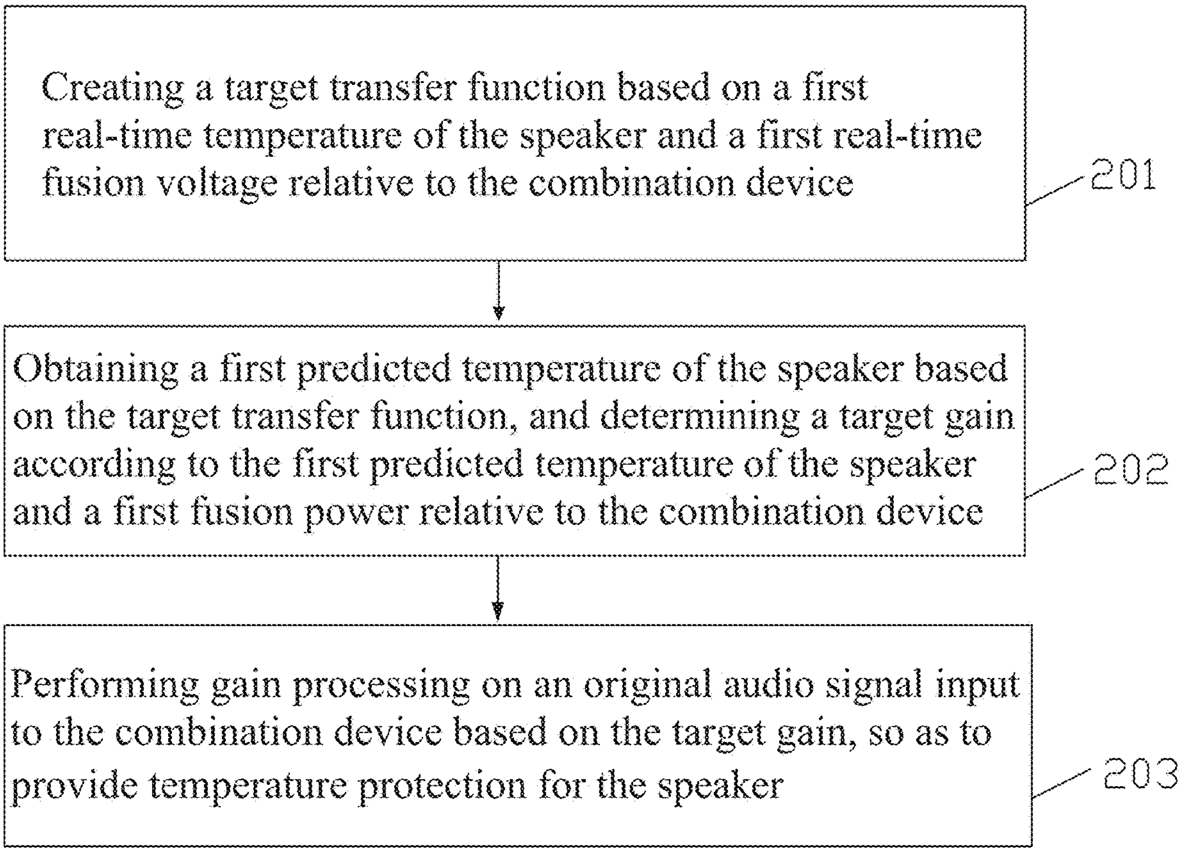
FIG. 2 is a schematic flowchart of a speaker temperature protection method according to the first embodiment of the present disclosure.

In order to solve a problem in the related art that temperature over-compression of the speaker and relatively large loss on speaker sound loudness are caused due to modeling by a single speaker, a first embodiment of the present disclosure provides a speaker temperature protection method, applied to a device, as shown in FIG. 1, FIG. 1 is a structural schematic diagram of the device according to the first embodiment of the present disclosure. The device includes a combination device (Combo device) and a power amplifier (PA), the combination device includes a speaker and a motor. Moreover, in the embodiment, the combination device further includes a capacitor, after the power amplifier sends out an analog signal, the analog signal is divided by the capacitor and then respectively loaded at both ends of the speaker and motor. As shown in FIG. 2, FIG. 2 is a schematic flowchart of a speaker temperature protection method according to the first embodiment of the present disclosure, and the speaker temperature protection method includes following steps.

Step 201: creating a target transfer function based on a first real-time temperature of the speaker and a first real-time fusion voltage relative to the combination device.

Specifically, in the embodiment, the motor and the speaker are first modeled, and a transfer function of a real-time temperature of the speaker and a fusion voltage relative to the combination device are obtained according to a heat transfer model of the motor and the speaker.

In some embodiments of the embodiment, the step 201 of creating the target transfer function based on the first real-time temperature of the speaker and the first real-time fusion voltage relative to the combination device includes according to a predetermined state equation, creating a first transfer function of the first real-time fusion voltage relative to the combination device and a first real-time voltage of the speaker, and creating a second transfer function of the first real-time fusion voltage relative to the combination device and a real-time voltage of the motor; performing data fitting on the first real-time temperature of the speaker and the first real-time voltage of the speaker to create a third transfer function; performing the data fitting on a real-time temperature of the motor and the real-time voltage of the motor to create a heat transfer function; and creating the target transfer function through combining the first transfer function, the second transfer function, the third transfer function, and the heat transfer function.

Specifically, in the embodiment, the target transfer function is created through connecting a transfer function of a voltage of the speaker and a fusion voltage relative to the combination device, a transfer function of the voltage of the speaker and a temperature of the speaker, a transfer function of a voltage of the motor and the fusion voltage relative to the combination device, and a heat transfer function of the motor and the speaker in series. The transfer function of the voltage of the speaker and the fusion voltage relative to the combination device is a partial pressure of the combination device and is obtained through the determined state equation; the transfer function of the voltage of the speaker and the temperature of the speaker is a partial pressure of the speaker, and is obtained through the determined state equation; the transfer function of the voltage of the motor and the fusion voltage relative to the combination device is obtained through real-time data fitting; and the heat transfer function of the motor and the speaker is also obtained through the real-time data fitting. Therefore, the embodiment not only introduces a partial pressure model, but also introduces a heat transfer model of the motor and the speaker, so that the target transfer function is more accurate.

Furthermore, in some embodiments of the embodiment, the target transfer function is illustrated as follow:

$$\hat{H}_T(f,t) = C(f,t)\cdot H_T(f)\cdot M(f,t)\cdot B(f) = \frac{U_{spk}(f)}{\hat{U}(f)}\cdot\frac{R(f)}{U_{spk}(f)}\cdot\frac{U_{mo}(f)}{\hat{U}(f)}\cdot\frac{R_{m-s}(f)}{U_{mo}(f)} = \frac{R(f)}{\hat{U}(f)}\cdot\frac{R_{m-s}(f)}{\hat{U}(f)};$$

where, $\hat{H}_T(f,t)$ illustrates the target transfer function, $C(f,t)$ illustrates the first transfer function, $M(f,t)$ illustrates the second transfer function, $H_T(f)$ illustrates the third transfer function, $B(f)$ illustrates the heat transfer function, $U_{spk}(f)$ illustrates a voltage of the speaker, $\ddot{U}(f)$ illustrates a fusion voltage relative to the combination device, $U_{mo}(f)$ illustrates a voltage of the motor, $R(f)$ illustrates a thermal resistance of the speaker, and $R_{m-s}(f)$ illustrates a thermal resistance of the motor.

Specifically, in the embodiment, in a heat transfer model composed of the combination device, the speaker and the motor are both heat sources, so that heat conduction between the speaker and the motor needs to be considered, and only the fusion voltage relative to the combination device is directly input, so that the heat transfer model is formed by combining four parts in series.

Step 202: obtaining a first predicted temperature of the speaker based on the target transfer function, and determining a target gain according to the first predicted temperature of the speaker and a first fusion power relative to the combination device.

Specifically, in the embodiment, a predicted temperature of the speaker is obtained through the target transfer function, and a compression gain of an audio signal is determined according the predicted temperature of the speaker and a fusion power relative to the combination device.

In some embodiments of the present disclosure, the step 202 of obtaining the first predicted temperature of the speaker based on the target transfer function, and determining the target gain according to the first predicted temperature of the speaker and the first fusion power relative to the combination device includes obtaining a second fusion power relative to the combination device based on a power amplifier multiple of the power amplifier, an impedance curve relative to the combination device, and a digital signal relative to the power amplifier; correcting the second fusion power relative to the combination device to obtain the first fusion power relative to the combination device; obtaining a second predicted temperature of the speaker based on the target transfer function, and correcting the second predicted temperature of the speaker to obtain the first predicted temperature of the speaker; and determining the target gain according to the first fusion power relative to the combination device and the first predicted temperature of the speaker.

Specifically, in the embodiment, the first fusion power relative to the combination device is obtained through performing calculation on ideal data to obtain the second fusion power relative to the combination device and then correcting the second fusion power relative to the combination device, where the second fusion power relative to the combination device is obtained through performing the calculation on the power amplifier multiple of the power amplifier, the impedance curve relative to the combination device, and the digital signal relative to the power amplifier. The first predicted temperature of the speaker is obtained through correcting an ideal predicted temperature of the speaker, where the ideal predicted temperature of the speaker is obtained through performing the calculation on the target transfer function. After the first fusion power relative to the combination device and the first predicted temperature of the speaker, the target gain is determined.

Furthermore, in some embodiments of the embodiment, the obtaining the second predicted temperature of the speaker based on the target transfer function, and correcting the second predicted temperature of the speaker to obtain the first predicted temperature of the speaker includes obtaining a second real-time temperature of the speaker based on a second real-time voltage of the speaker and a real-time current of the speaker; comparing the second real-time temperature of the speaker with the second predicted temperature of the speaker to obtain a temperature error; and correcting the second predicted temperature of the speaker according to the temperature error to obtain the first predicted temperature of the speaker.

Figure 3:
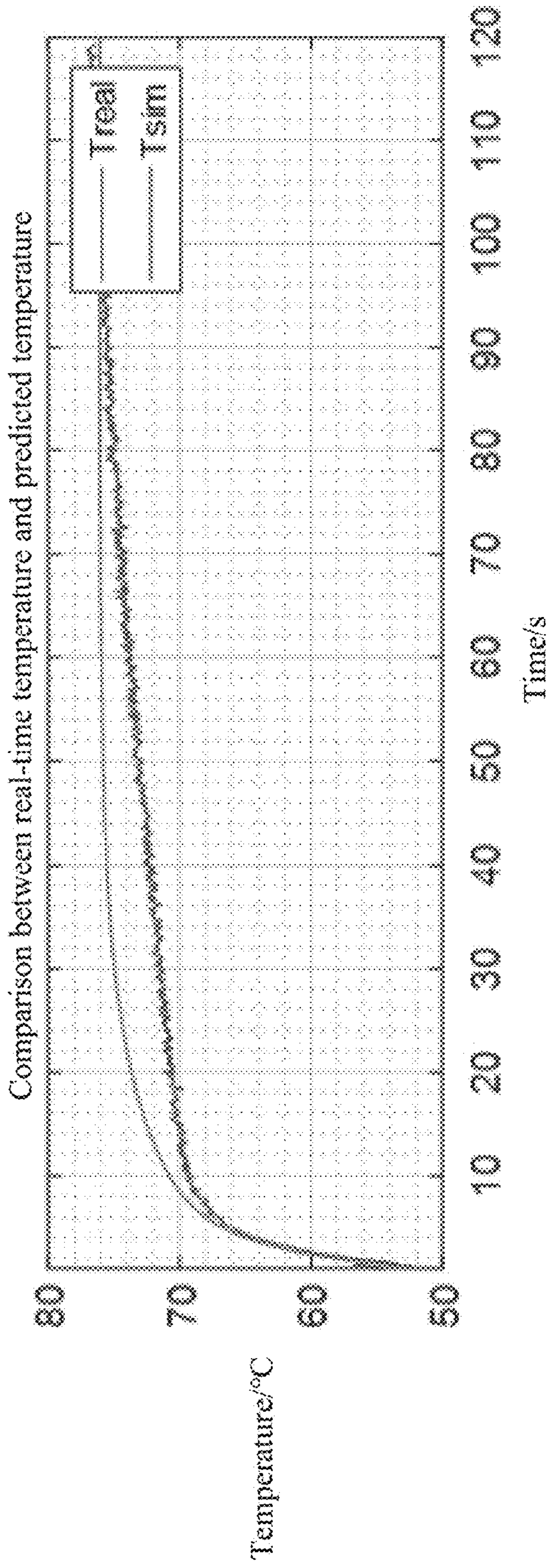
FIG. 3 is a comparison diagram of a real-time temperature and a predicted temperature of a speaker according to the first embodiment of the present disclosure.
Figure 4:
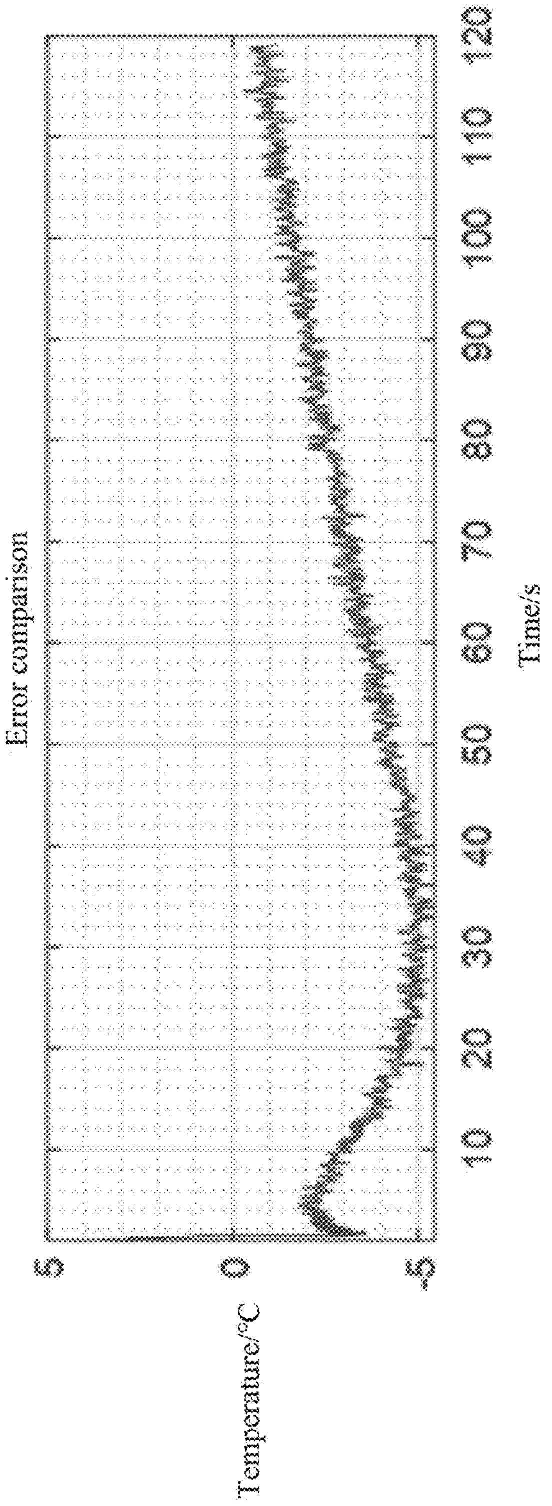
FIG. 4 is a comparison diagram of a temperature error between the real-time temperature and the predicted temperature of the speaker according to the first embodiment of the present disclosure.

Specifically, in the embodiment, a real-time temperature of a speaker voice coil is obtained through a real-time voltage of the speaker and the real-time current of the speaker, the real-time temperature of the speaker voice coil is compared with the predicted temperature of the speaker obtained the target transfer function to obtain the temperature error, and the predicted temperature of the speaker is corrected according to the temperature error, so as to obtain an accurate predicted temperature speaker. In particular, the predicted temperature of the speaker is obtained by a temperature prediction model, the temperature prediction model has two modes of feedforward and feedback, and obtaining the predicted temperature of the speaker through the target transfer function is the mode of feedforward, that is, the target transfer function is a theoretical model and cannot completely and accurately predict an actual temperature of the speaker. As shown in FIG. 3, FIG. 3 is a comparison diagram of the real-time temperature and the predicted temperature of the speaker, in which Treal illustrates the real-time temperature of the speaker, Tsim illustrates the predicted temperature of the speaker, an abscissa illustrates a transmission time with a unit of s, and an ordinate illustrates a temperature with a unit of ° C., the real-time temperature of the speaker is lower than the predicted temperature of the speaker in some periods, as shown in FIG. 4, FIG. 4 is a comparison diagram of a temperature error between the real-time temperature of the speaker and the predicted temperature of the speaker, in which an abscissa illustrates a transmission time with a unit of s, and an ordinate illustrates a temperature with a unit of ° C., it can be seen from FIG. 4 that the temperature error between the real-time temperature of the speaker and the predicted temperature of the speaker at some transmission moments is relatively large, for example, the temperature error between the real-time temperature of the speaker and the predicted temperature of the speaker at 30 seconds is relatively large. Therefore, the real-time voltage of the speaker and the real-time current of the speaker are iterated in the theoretical model to obtain the real-time temperature of the speaker to correct an intermediate value of the real-time temperature of the speaker, thereby improving accuracy of the predicted temperature of the speaker. Moreover, a temperature fed back by the temperature prediction model is selected from a temperature of the speaker voice coil, a temperature of a motor magnet, and temperatures of internal environment and external environment.

Furthermore, in some embodiments of the embodiment, the correcting the second fusion power relative to the combination device to obtain the first fusion power relative to the combination device includes obtaining a third fusion power relative to the combination device according a second real-time fusion voltage relative to the combination device and a real-time fusion current relative to the combination device; comparing the third fusion power relative to the combination device with the second fusion power relative to the combination device to obtain a power error; and correcting the second fusion power relative to the combination device according to the power error to obtain the first fusion power relative to the combination device.

Specifically, in the embodiment, a fusion power relative to the combination device is obtained through a power prediction model, the power prediction model includes two modes of feedforward and feedback, accuracy of a theoretical fusion power relative to combination device obtained in the mode of feedforward mode is relatively low, and therefore the theoretical fusion power relative to the combination needs to be corrected; the fusion power relative to the combination device is obtained through a real-time fusion voltage relative to the combination device and the real-time fusion current relative to the combination device, then the real-time fusion power relative to the combination device is compared with the theoretical fusion power relative to the combination device to obtain the power error, and the theoretical fusion power relative to the combination device is corrected according to the power error to obtain an actual fusion power relative to the combination device.

Furthermore, in some embodiments of the embodiment, the determining the target gain according to the first fusion power relative to the combination device and the first predicted temperature of the speaker includes comparing the first predicted temperature of the speaker with a predetermined temperature threshold of the speaker to obtain a temperature difference; and determining the target gain according to first fusion power relative to the combination device and a power relative to the temperature difference.

Specifically, in the embodiment, after the predicted temperature of the speaker is obtained, the temperature difference is obtained through comparing the predicted temperature of the speaker with the predetermined temperature threshold of the speaker, so that a power required by the predicted temperature of the speaker for reaching the predetermined temperature threshold of the speaker is determined and the compression gain of the audio signal is obtained through the power and the fusion power relative to the combination device.

Step 203: performing gain processing on an original audio signal input to the combination device based on the target gain, so as to provide temperature protection for the speaker.

Figure 5:
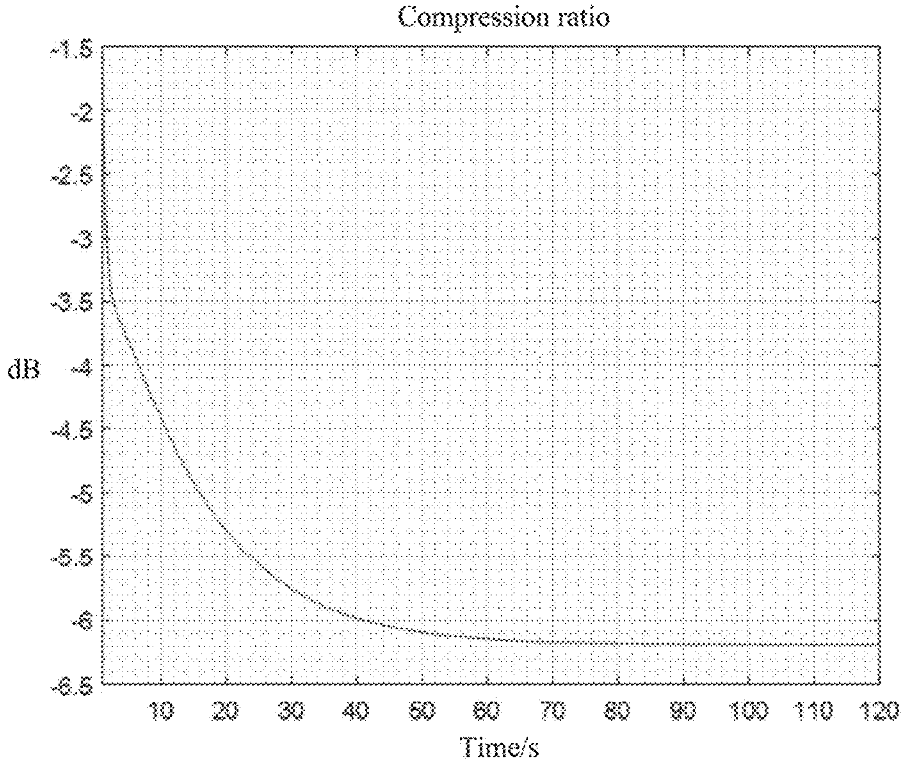
FIG. 5 is a schematic diagram of a temperature compression result of the speaker according to the first embodiment of the present disclosure.

Specifically, in the embodiment, the gain processing is performed on the original audio signal input to the combination device based on the target, so that temperature protection of the speaker is achieved. For example, as shown in FIG. 5, FIG. 5 is a schematic diagram of a temperature compression result of the speaker, in which an abscissa illustrates a transmission time with a unit of s, and an ordinate illustrates a ratio of two temperature values with a unit of dB, after a temperature protection module based on the partial pressure of the speaker and the heat transfer model composed of the combination device is provided, loudness of the speaker is ensured, and the temperature of the speaker is also effectively compressed.

According to technical solutions of the first embodiment of the present disclosure, the target transfer function is created based on the first real-time temperature of the speaker and the first real-time fusion voltage relative to the combination device, the first predicted temperature of the speaker is obtained based on the target transfer function, and the target gain is determined according to the first predicted temperature of the speaker and the first fusion power relative to the combination device, and the gain processing is performed on the original audio signal input to the combination device based on the target gain, so as to provide the temperature protection for the speaker. According to the present disclosure, the target transfer function is created according to a heat transfer model of the motor and the speaker, and the target gain is obtained through combining a predicted temperature of the speaker obtained based on the target transfer function and a fusion power relative to the combination device, the gain processing is performed on the original audio signal input to the combination device based on the target gain, so that a temperature of the speaker is kept below a maximum allowable temperature and audio distortion is reduced.

Figure 6:
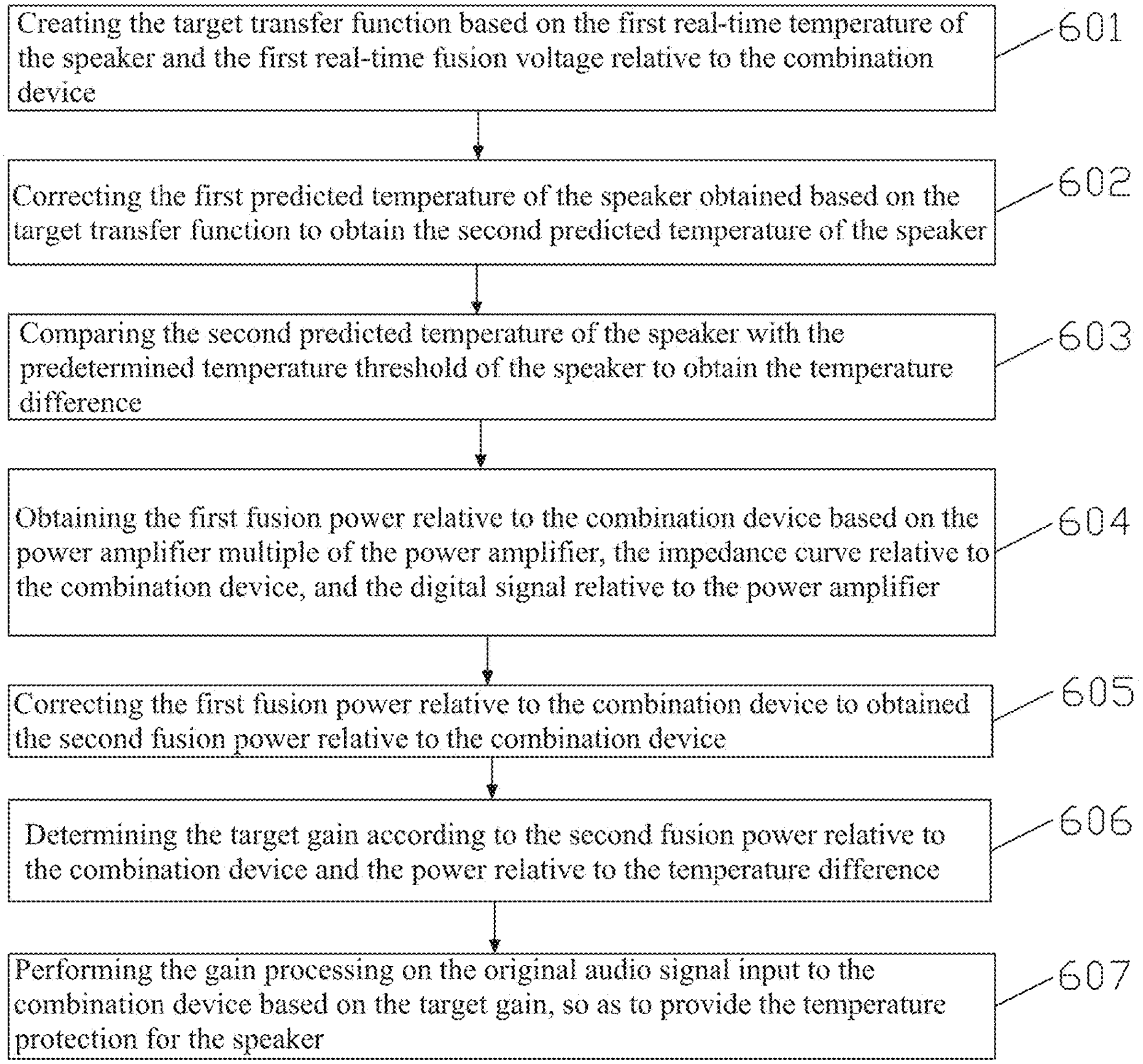
FIG. 6 is schematic flowchart of a detailed speaker temperature protection method according to a second embodiment of the present disclosure.

As shown in FIG. 6, FIG. 6 is schematic flowchart of a detailed speaker temperature protection method according to a second embodiment of the present disclosure, and the detailed speaker temperature protection includes following steps.

Step 601: creating the target transfer function based on the first real-time temperature of the speaker and the first real-time fusion voltage relative to the combination device.

Step 602: correcting the first predicted temperature of the speaker obtained based on the target transfer function to obtain the second predicted temperature of the speaker.

Step 603: comparing the second predicted temperature of the speaker with the predetermined temperature threshold of the speaker to obtain the temperature difference.

Step 604: obtaining the first fusion power relative to the combination device based on the power amplifier multiple of the power amplifier, the impedance curve relative to the combination device, and the digital signal relative to the power amplifier.

Step 605: correcting the first fusion power relative to the combination device to obtained the second fusion power relative to the combination device.

Step 606: determining the target gain according to the second fusion power relative to the combination device and the power relative to the temperature difference.

Step 607: performing the gain processing on the original audio signal input to the combination device based on the target gain, so as to provide the temperature protection for the speaker.

Figure 7:
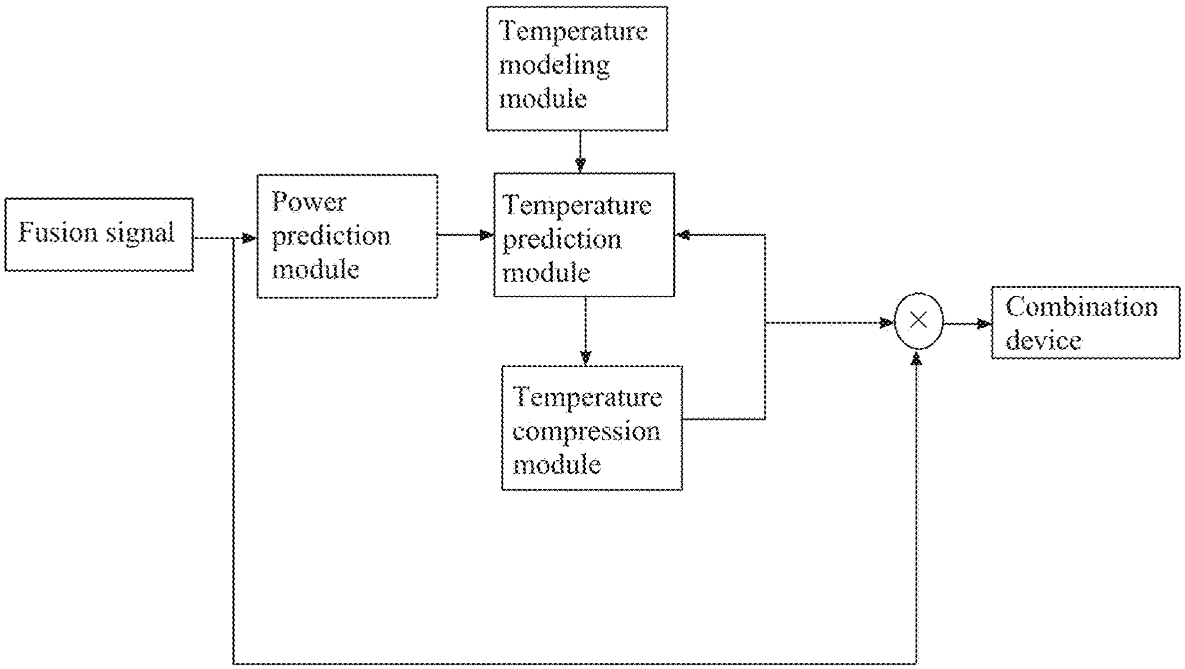
FIG. 7 is a module schematic diagram of a speaker temperature protection device of a combination device with a single power amplifier according to the second embodiment of the present disclosure.

Specifically, in the embodiment, the above steps are applied to a speaker temperature protection device in a combination device with a single power amplifier, the speaker temperature protection device includes a main link, sub-links, a power prediction module, a temperature modeling module, temperature prediction modules, and a temperature compression module. In particular, the sub-links are respectively connected to the main link in parallel, output ends of the sub-links are connected to an input end of the temperature compression module, the temperature compression module is disposed in the main link, an input end of the temperature compression module is configured to receive the original audio signal, an output end of the temperature compression module is connected to the speaker, and an input end of the temperature compression module is further connected to an output end of the power prediction module. The temperature modeling module is disposed in one of the sub-links, and the temperature prediction modules are respectively disposed in the rest of the sub-links in series. As shown in FIG. 7, FIG. 7 is a module schematic diagram of the speaker temperature protection device of the combination device with the single power amplifier, in which fusion signal refers to fusion signals of the speaker and the motor, and an output voltage obtained by multiplying the compression gain by the fusion signal is input into the combination device. The temperature modeling module is configured to create a transfer function of the temperature of the speaker and the fusion voltage relative to the combination device, the power prediction module updates a relatively accurate fusion current through continuously updating the impedance curve relative to the combination device to predict a power. Moreover, the power prediction model has two modes of feedback and feedforward, the mode of feedback obtains a thermal power through a feedback voltage and a feedback current. The temperature compression module is configured to perform the gain processing on the original audio signal by using the target gain. The temperature prediction model also has two modes of feedback and feedforward, the mode of feedback obtains a temperature of the speaker voice coil through the feedback voltage and a current, so as to continuously correct errors of the temperature modeling module.

It should be understood that the sequence of serial numbers of steps in the embodiment is not the execution sequence of the steps, the execution sequence of the steps should be determined by its function and internal logic, and an implementation process of the embodiments of the present disclosure should not be uniquely limited.

According to technical solutions of the second embodiment of the present disclosure, the target transfer function is created based on the first real-time temperature of the speaker and the first real-time fusion voltage relative to the combination device, the first predicted temperature of the speaker obtained based on the target transfer function is corrected to obtain the second predicted temperature of the speaker, the second predicted temperature of the speaker is compared with the predetermined temperature threshold of the speaker to obtain the temperature difference, the first fusion power relative to the combination device is obtained based on the power amplifier multiple of the power amplifier, the impedance curve relative to the combination device, and the digital signal relative to the power amplifier, the first fusion power relative to the combination device is corrected to obtained the second fusion power relative to the combination device, the target gain is determined according to the second fusion power relative to the combination device and the power relative to the temperature difference, and the gain processing is performed on the original audio signal input to the combination device based on the target gain, so as to provide the temperature protection for the speaker. In the embodiment, the target transfer function is created according to the heat transfer model of the motor and the speaker, the speaker prediction temperature is obtained through the target transfer function, the target gain is obtained in combination with the fusion power relative to the combination device, and the input audio signal is subjected to the gain processing based on the target gain, so that the temperature of the speaker is kept below the maximum allowable temperature to ensure that the speaker is not damaged, meanwhile, the speaker is still allowed to play the volume as large as possible, and the audio distortion is reduced as much as possible.

Figure 8:
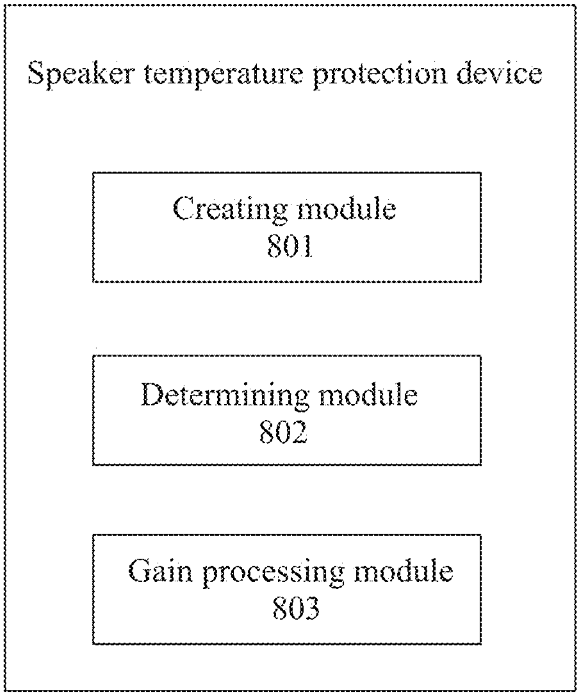
FIG. 8 is a module schematic diagram of the speaker temperature protection device according to a third embodiment of the present disclosure.

FIG. 8 is a module schematic diagram of the speaker temperature protection device according to a third embodiment of the present disclosure, applied to a device, the device includes a power amplifier and a combination device, and the combination device includes a speaker and a motor. The speaker temperature protection device is applied to the speaker temperature protection method as foregoing. As shown in FIG. 8, the speaker temperature protection device mainly includes a creating module 801, a determining module 802, and a gain processing module 803. The creating module 801 is configured to create a target transfer function based on a first real-time temperature of the speaker and a first real-time fusion voltage relative to the combination device, the determining module 802 is configured to determine a target gain according to a first predicted temperature of the speaker obtained based on the target transfer function and a first fusion power relative to the combination device, and the gain processing module 803 is configured to perform gain processing on an original audio signal input to the combination device based on the target gain, so as to provide temperature protection for the speaker.

In some embodiments of the embodiment, the creating module 801 is specifically configured to, according to a predetermined state equation, create a first transfer function of the first real-time fusion voltage relative to the combination device and a first real-time voltage of the speaker, create a second transfer function of the first real-time fusion voltage relative to the combination device and a real-time voltage of the motor, perform data fitting on the first real-time temperature of the speaker and the first real-time voltage of the speaker to create a third transfer function, perform the data fitting on a real-time temperature of the motor and the real-time voltage of the motor to create a heat transfer function, and create the target transfer function through combining the first transfer function, the second transfer function, the third transfer function, and the heat transfer function. The target transfer function is illustrated as follow $$\begin{aligned}\hat{H}_T(f,t) &= C(f,t)\cdot H_T(f)\cdot M(f,t)\cdot B(f) = \frac{U_{spk}(f)}{\hat{U}(f)}\cdot\frac{R(f)}{U_{spk}(f)}\cdot\\ &\quad\frac{U_{mo}(f)}{\hat{U}(f)}\cdot\frac{R_{m-s}(f)}{U_{mo}(f)}\\ &= \frac{R(f)}{\hat{U}(f)}\cdot\frac{R_{m-s}(f)}{\hat{U}(f)}\end{aligned};$$

where, $\hat{H}_T(f,t)$ illustrates the target transfer function, $C(f,t)$ illustrates the first transfer function, $M(f,t)$ illustrates the second transfer function, $H_T(f)$ illustrates the third transfer function, $B(f)$ illustrates the heat transfer function, $U_{spk}(f)$ illustrates a voltage of the speaker, $\hat{U}(f)$ illustrates a fusion voltage relative to the combination device, $U_{mo}(f)$ illustrates a voltage of the motor, $R(f)$ illustrates a thermal resistance of the speaker, and $R_{m-s}(f)$ illustrates a thermal resistance of the motor In some embodiments of the embodiment, the determining module 802 is configured to obtain second fusion power relative to the combination device based on a power amplifier multiple of the power amplifier, an impedance curve relative to the combination device, and a digital signal relative to the power amplifier, correct the second fusion power relative to the combination device to obtain the first fusion power relative to the combination device, obtain a second predicted temperature of the speaker based on the target transfer function, correct the second predicted temperature of the speaker to obtain the first predicted temperature of the speaker, and determine the target gain according to the first fusion power relative to the combination device and the first predicted temperature of the speaker.

Furthermore, in some embodiments of the embodiment, the speaker temperature protection device further includes a first correction module, configured to obtain a second real-time temperature of the speaker based on a second real-time voltage of the speaker and a real-time current of the speaker, compare the second real-time temperature of the speaker with the second predicted temperature of the speaker to obtain a temperature error, and correct the second predicted temperature of the speaker according to the temperature error to obtain the first predicted temperature of the speaker.

Furthermore, in some embodiments of the embodiment, the speaker temperature protection device further includes a second correction module, configured to obtain a third fusion power relative to the combination device according a second real-time fusion voltage relative to the combination device and a real-time fusion current relative to the combination device, compare the third fusion power relative to the combination device with the second fusion power relative to the combination device to obtain a power error, and correct the second fusion power relative to the combination device according to the power error to obtain the first fusion power relative to the combination device.

Furthermore, in some embodiments of the embodiment, the determining module 802 is further configured to compare the first predicted temperature of the speaker with a predetermined temperature threshold of the speaker to obtain a temperature difference, and determine the target gain according to first fusion power relative to the combination device and a power relative to the temperature difference.

It should be noted that the speaker temperature protection method in the foregoing embodiments may be implemented based on the speaker temperature protection device provided in the embodiment, and those who skilled in the art may clearly understand that, for convenience and brevity of description, a specific working process of the speaker temperature protection device described in the embodiment may refer to the corresponding process in the foregoing method embodiments, and details are not described herein again.

According to the technical solutions of the third embodiment of the present disclosure, the target transfer function is created based on the first real-time temperature of the speaker and the first real-time fusion voltage relative to the combination device, the first predicted temperature of the speaker is obtained based on the target transfer function, and the target gain is determined according to the first predicted temperature of the speaker and the first fusion power relative to the combination device, and the gain processing is performed on the original audio signal input to the combination device based on the target gain, so as to provide the temperature protection for the speaker. According to the present disclosure, the target transfer function is created according to the heat transfer model of the motor and the speaker, and the target gain is obtained through combining a predicted temperature of the speaker obtained based on the target transfer function and a fusion power relative to the combination device, the gain processing is performed on the original audio signal input to the combination device based on the target gain, so that a temperature of the speaker is kept below a maximum allowable temperature and audio distortion is reduced.

Figure 9:
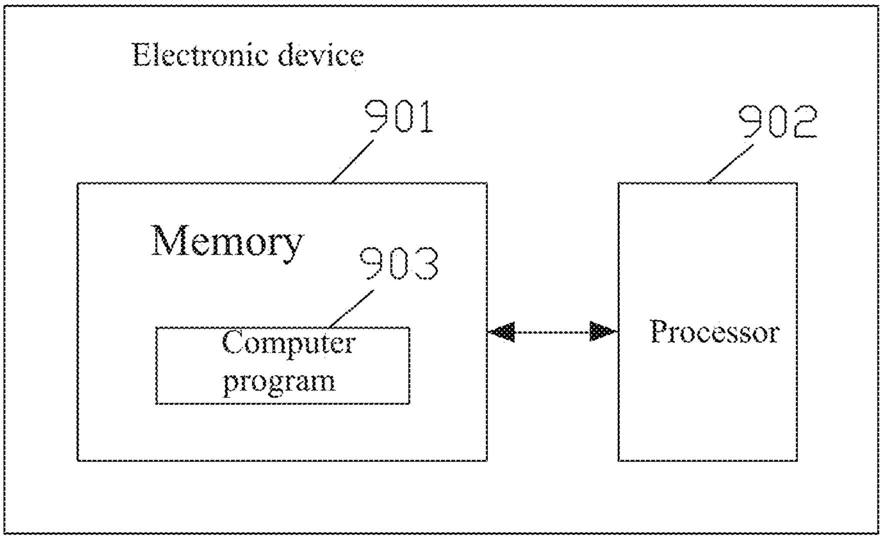
FIG. 9 is a structural schematic diagram of an electronic device according to a fourth embodiment of the present disclosure.

FIG. 9 is a structural schematic diagram of an electronic device according to a fourth embodiment of the present disclosure, the electronic device is configured to execute the speaker temperature protection method as foregoing, mainly including a memory 901, a processor 902, and a computer program 903. The memory 901 and the processor 902 are communicatively connected. The processor 902 executes the computer program 903 to execute the speaker temperature protection method as mentioned in the first embodiment or the second embodiment, where one or more processor may be provided.

The memory 901 is selected from a high-speed random access memory (RAM) and a non-volatile memory, such as a disk memory. The memory 901 is configured to store executable program code, and the processor 902 is coupled to the memory 901.

Furthermore, the embodiments of the present disclosure further provide a computer-readable storage medium, the computer-readable storage medium is disposed in the electronic device, and the computer program may be the processor 901 as shown in FIG. 9.

The computer-readable storage medium includes a computer program, and the computer program is executed by a processor to execute the speaker temperature protection method as foregoing. Furthermore, the computer-readable storage medium is elected from various media that may store program codes, such as a USB flash disk, a mobile hard disk, a read-only memory (ROM), a RAM, a disk, a compact disc, etc.

In the embodiments provided in the present disclosure, it should be understood that the disclosed device and method may be implemented in other manners. For example, the embodiments about the device described above are merely illustrative, for example, the division of modules is merely a logical function division, and there may be another division manner during actual implementation, for example, multiple modules or components may be combined or may be integrated into another system, or some features may be ignored, or not performed. Moreover, the displayed or discussed mutual coupling or direct coupling or communication connection may be an indirect coupling or communication connection through some interfaces, devices, or modules, and may be electrical, mechanical, or other forms.

Modules described as separate components may or may not be physically separated, and components displayed as modules may or may not be physical modules, that is, may be located in one place, or may be distributed on multiple network modules. Some or all of the modules may be selected according to actual needs to achieve objectives of solutions of the embodiments.

In addition, functional modules in the embodiments of the present disclosure may be integrated into one processing module, or each of the modules may exist alone physically, or two or more modules may be integrated into one module. The integrated module may be implemented in a form of hardware, or may be implemented in a form of a software functional module.

When the integrated module is implemented in the form of the software functional module and sold or used as an independent product, the integrated module may be stored in a computer-readable storage medium. Based on this understanding, all or part of the technical solutions, contributing to the related art, of the present disclosure or all or part of the technical solution can be embodied in the form of a computer software product, and the computer software product is stored in a readable storage medium, and includes several instructions for enabling a computer device such as a personal computer, a server, or a network device, etc., to perform all or part of the steps of the methods of the embodiments of the present disclosure. The foregoing computer-readable storage medium includes various media that may store program codes, such as a USB flash disk, a mobile hard disk, a ROM, a RAM, a disk, a compact disc, etc.

It should be noted that, for the foregoing embodiments about method, for ease of description, all of the foregoing embodiments about method are expressed as a series of action combinations, but those who skilled in the art should understand that the present disclosure is not limited by the described action sequence, since some steps may be performed in other sequences or simultaneously according to the present disclosure. Moreover, those who skilled in the art should also know that the embodiments described in the specification are all preferred embodiments, and the involved actions and modules are not necessarily required in the present disclosure.

In the foregoing embodiments, the descriptions of the various embodiments are emphasized respectively, and some parts that are not described in detail in some embodiments may refer to related descriptions of other embodiments.

The foregoing is a description of the speaker temperature protection method, the speaker temperature protection device, the electronic device, and the computer-readable storage medium provided by the present disclosure, and for those who skilled in the art, according to the idea of the embodiments of the present disclosure, changes may be made on specific implementation methods and application ranges, and in summary, the content of the present specification should not be construed as limiting the present disclosure.

What is claimed is:

1. A speaker temperature protection method, applied to a device comprising a power amplifier and a combination device comprising a speaker and a motor, comprising:

creating a target transfer function based on a first real-time temperature of the speaker and a first real-time fusion voltage relative to the combination device;

obtaining a first predicted temperature of the speaker based on the target transfer function, and determining a target gain according to the first predicted temperature of the speaker and a first fusion power relative to the combination device; and performing gain processing on an original audio signal input to the combination device based on the target gain, so as to provide temperature protection for the speaker.

2. The speaker temperature protection method according to claim 1, wherein the creating the target transfer function based on the first real-time temperature of the speaker and the first real-time fusion voltage relative to the combination device comprises:

according to a predetermined state equation, creating a first transfer function of the first real-time fusion voltage relative to the combination device and a first real-time voltage of the speaker, and creating a second transfer function of the first real-time fusion voltage relative to the combination device and a real-time voltage of the motor;

performing data fitting on the first real-time temperature of the speaker and the first real-time voltage of the speaker to create a third transfer function;

performing the data fitting on a real-time temperature of the motor and the real-time voltage of the motor to create a heat transfer function; and creating the target transfer function through combining the first transfer function, the second transfer function, the third transfer function, and the heat transfer function.

3. The speaker temperature protection method according to claim 2, wherein the target transfer function is illustrated as follow:

$$\hat{H}_T(f,t) = C(f,t)\cdot H_T(f)\cdot M(f,t)\cdot B(f) = \frac{U_{spk}(f)}{\hat{U}(f)}\cdot\frac{R(f)}{U_{spk}(f)}\cdot\frac{U_{mo}(f)}{\hat{U}(f)}\cdot\frac{R_{m-s}(f)}{U_{mo}(f)} = \frac{R(f)}{\hat{U}(f)}\cdot\frac{R_{m-s}(f)}{\hat{U}(f)};$$

where, $\hat{H}_T(f,t)$ illustrates the target transfer function, $C(f,t)$ illustrates the first transfer function, $M(f,t)$ illustrates the second transfer function, $H_T(f)$ illustrates the third transfer function, $B(f)$ illustrates the heat transfer function, $U_{spk}(f)$ illustrates a voltage of the speaker, $\hat{U}(f)$ illustrates a fusion voltage relative to the combination device, $U_{mo}(f)$ illustrates a voltage of the motor, $R(f)$ illustrates a thermal resistance of the speaker, and $R_{m-s}(f)$ illustrates a thermal resistance of the motor.

4. The speaker temperature protection method according to claim 1, wherein the obtaining the first predicted temperature of the speaker based on the target transfer function, and determining the target gain according to the first predicted temperature of the speaker and the first fusion power relative to the combination device comprises:

obtaining a second fusion power relative to the combination device based on a power amplifier multiple of the power amplifier, an impedance curve relative to the combination device, and a digital signal relative to the power amplifier;

correcting the second fusion power relative to the combination device to obtain the first fusion power relative to the combination device;

obtaining a second predicted temperature of the speaker based on the target transfer function, and correcting the second predicted temperature of the speaker to obtain the first predicted temperature of the speaker; and determining the target gain according to the first fusion power relative to the combination device and the first predicted temperature of the speaker.

5. The speaker temperature protection method according to claim 4, wherein the obtaining the second predicted temperature of the speaker based on the target transfer function, and correcting the second predicted temperature of the speaker to obtain the first predicted temperature of the speaker comprises:

obtaining a second real-time temperature of the speaker based on a second real-time voltage of the speaker and a real-time current of the speaker;

comparing the second real-time temperature of the speaker with the second predicted temperature of the speaker to obtain a temperature error; and correcting the second predicted temperature of the speaker according to the temperature error to obtain the first predicted temperature of the speaker.

6. The speaker temperature protection method according to claim 4, wherein the correcting the second fusion power relative to the combination device to obtain the first fusion power relative to the combination device comprises:

obtaining a third fusion power relative to the combination device according a second real-time fusion voltage relative to the combination device and a real-time fusion current relative to the combination device;

comparing the third fusion power relative to the combination device with the second fusion power relative to the combination device to obtain a power error; and correcting the second fusion power relative to the combination device according to the power error to obtain the first fusion power relative to the combination device.

7. The speaker temperature protection method according to claim 4, wherein the determining the target gain according to the first fusion power relative to the combination device and the first predicted temperature of the speaker comprises:

comparing the first predicted temperature of the speaker with a predetermined temperature threshold of the speaker to obtain a temperature difference; and determining the target gain according to first fusion power relative to the combination device and a power relative to the temperature difference.

8. A speaker temperature protection device, applied to a device comprising a power amplifier and a combination device comprising a speaker and a motor, comprising:

a creating module;

a determining module; and a gain processing module;

the creating module is configured to create a target transfer function based on a first real-time temperature of the speaker and a first real-time fusion voltage relative to the combination device; the determining module is configured to determine a target gain according to a first predicted temperature of the speaker obtained based on the target transfer function and a first fusion power relative to the combination device; and the gain processing module is configured to perform gain processing on an original audio signal input to the combination device based on the target gain, so as to provide temperature protection for the speaker.

9. An electronic device, comprising:
a memory; and
a processor;
wherein the processor is configured to execute a computer program stored in the memory; the processor executes the computer program to execute the speaker temperature protection method according to claim 1.

10. A computer-readable storage medium, comprising:
a computer program;
wherein the computer program is executed by a processor to execute the speaker temperature protection method according to claim 1.

* * * * *